June 6, 1939.   R. D. CHEESMAN   2,160,956
AIR CONTROL FOR KILN-COOLER ASSEMBLIES
Filed Aug. 3, 1938   2 Sheets-Sheet 1
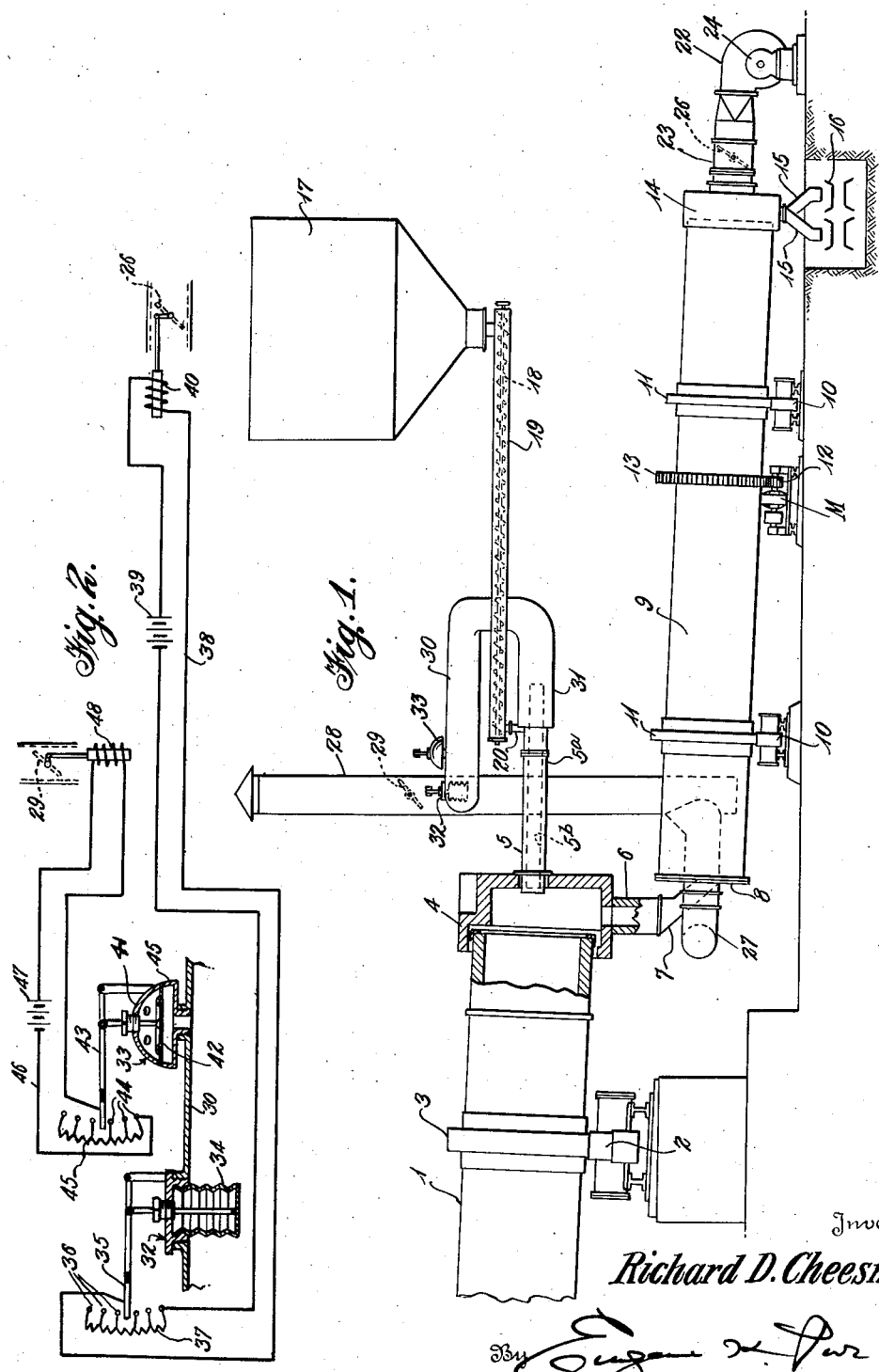
Inventor
Richard D. Cheesman
By Eugene H. Purdy
Attorney

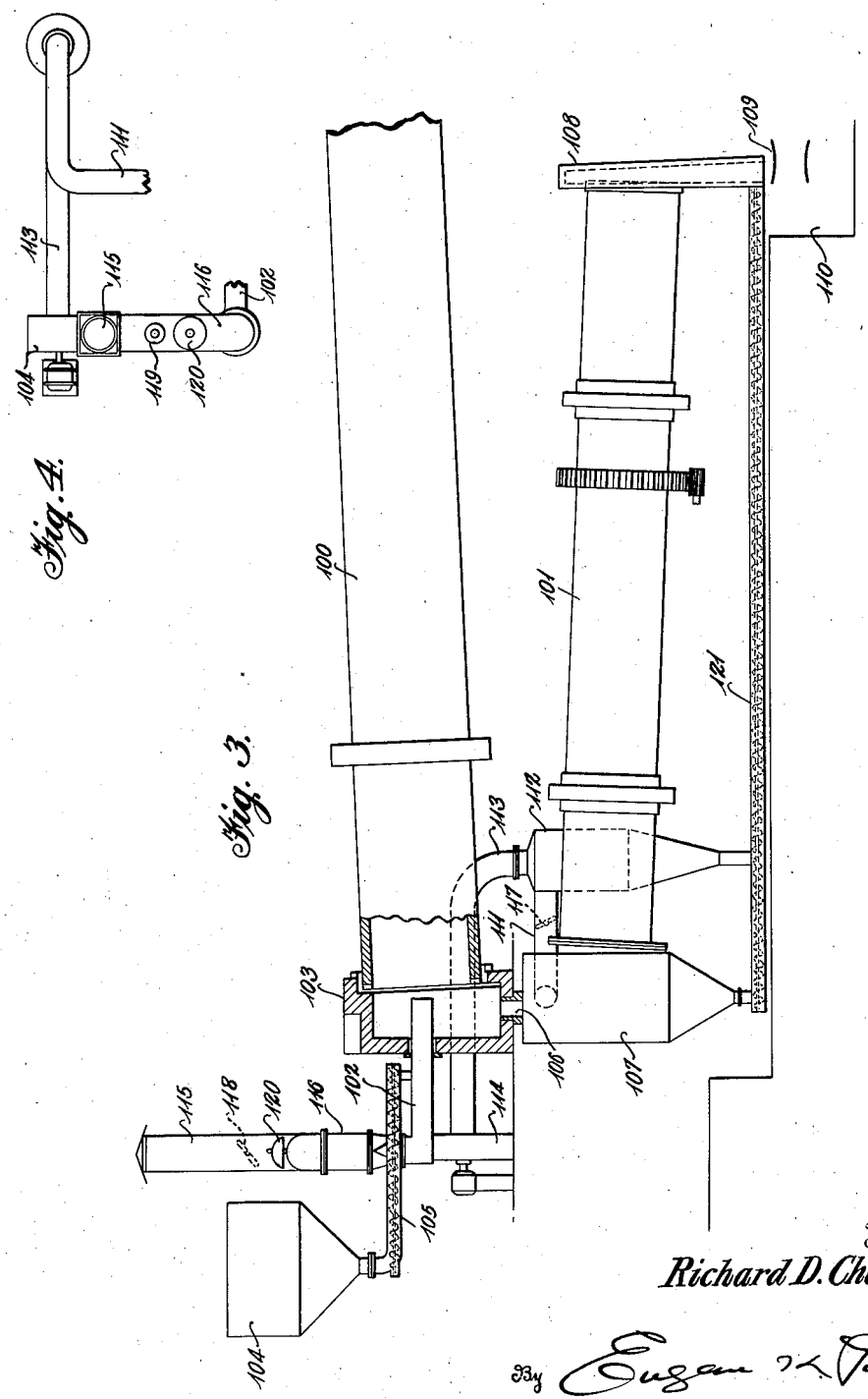

Patented June 6, 1939

UNITED STATES PATENT OFFICE 2,160,956

AIR CONTROL FOR KILN-COOLER ASSEMBLIES

Richard D. Cheesman, Allentown, Pa., assignor to Traylor Engineering and Manufacturing Company, Allentown, Pa., a corporation of Delaware Application August 3, 1938, Serial No. 222,940

14 Claims. (Cl. 263—53)

This invention relates to rotary kiln operation and is concerned more especially with the automatic regulation of the air supplied to such kilns for supporting combustion of the burner flame so as to maintain uniform heating conditions within the kiln. More specifically the invention relates to rotary kilns of the type in which a cooler is included in circuit with the kiln for cooling the hot material, such for example as cement clinker, issuing from the kiln by means of a current of fresh air drawn into the cooler in heat transfer relationship with the material therein, this heated air after its passage through the cooler being utilized to support combustion of the burner flame within the kiln.

An important object of my invention is to provide in a rotary kiln and cooler assembly a method and means for controlling the temperature and volume of the air entering the kiln from the cooler, whereby changes in the heating conditions of the cooler are automatically compensated for.

More specifically, my invention contemplates controlling the amount of fresh air entering the cooler in accordance with its temperature after leaving the cooler—or, otherwise stated, in accordance with the temperature of the material traveling through the cooler—and in maintaining the volume of air supplied to the kiln constant by automatically venting to the atmosphere excess air beyond that predetermined amount which is most favorable to burner operation within the kiln. The air supplied to the kiln from the cooler may comprise either the primary air for conveying the fuel through the burner pipe into the kiln, or such primary air together with a suitable volume of secondary air, which latter is introduced into the kiln exteriorly of the burner pipe to supplement the primary air in supporting combustion of the burner flame.

The invention has for another object to automatically insure uniform heating conditions within the kiln by means of a blower or fan, or both, adapted to be operated at constant speed, to promote a flow of air through the cooler and into the kiln, and the provision of means responsive to the heat and pressure of the air supplied to the kiln for regulating the admission of outside air to the cooler and the escape of excess heated air to the atmosphere.

Other objects and advantages will be apparent from the following detailed description of a preferred embodiment of my invention, reference being had to the annexed drawings, in which:

Figure 1 is a view in side elevation of a rotary kiln and cooler assembly only one end of the kiln being shown and parts being broken away for clearness;

Figure 2 illustrates diagrammatically the temperature and pressure responsive means for controlling the valves for admitting air to the cooler and expelling excess heated air to the atmosphere;

Figure 3 represents a modification of the kiln-cooler assembly shown in Figs. 1 and 2; and Figure 4 is a detail fragmentary plan view of a portion of the apparatus of Fig. 3.

Referring to the embodiment shown in Figs. 1 and 2 of the drawings, 1 indicates the discharge end of a horizontal rotary kiln of the type used in the production of Portland cement. The kiln is supported in the usual manner upon rollers 2 bearing upon tires 3 (only one being shown) encircling the kiln, and the kiln is rotated in any suitable manner as is well known in the art. A hood 4 closes the discharge end of the kiln and projecting through the end wall of the hood is a burner 5 for directing a flame lengthwise into the kiln. The floor of the hood is provided with a downspout 6 and the latter opens at its lower end into an inclined feed spout 7. The lower end of the feed spout passes through a stationary cover plate 8 closing the inlet end of a rotary cooling drum 9. As a consequence, the cement clinker discharging from the end of the kiln passes through the downspout 6 and through the feed spout 7 into the forward or inlet end of the cooling drum.

The cooling drum 9 is disposed at a slight inclination to the horizontal from its inlet and downwardly toward its outlet end and, similarly to the kiln, is supported for rotation upon rollers 10 engaging tires 11 located intermediate the length of the drum. Rotation may be imparted to the cooling drum through any suitable means, such as by a motor M which drives a pinion 12 meshing with a ring gear 13 fastened to the circumference of the drum. The outlet end of the drum is closed by a hood 14 which discharges through spouts 15 into an endless pan conveyor 16 located in a pit below said hood and serving for the removal of the clinker.

One mode of firing the kiln is by the injection of pulverized coal into the kiln under air pressure, although other types of fuels, such as oil or gas, may be employed. One form of pulverized fuel burner which lends itself for employment with the apparatus of the present invention corresponds in all essential respects to that shown in my prior Patent No. 1,989,665 granted February 5, 1935. In the employment of such a type of burner, powdered coal contained in a bin 17 is removed by a spiral conveyor 18, confined within a horizontally disposed tubular casing 19, from the bottom of the hopper to a downspout 20 located at one end of the tubular casing. This downspout extends through the outer pipe 5a of the burner 5 and delivers material into the inner pipe 5b, indicated in dotted lines in Fig. 1.

The air used to cool the hot clinker in the cooling drum becomes highly heated after passing through the latter and is therefore suitable for use as the primary and secondary air to support combustion of the flame within the kiln. As shown in Fig. 1, fresh air is taken from outside the cooling drum by a blower 22 and delivered thereinto through a horizontal sleeve 23 extending between the discharge side of the blower and the hood 14 closing the outlet end of the cooling drum. The blower is driven by a motor 24. A butterfly valve 26 within the sleeve 23 regulates the flow of air through the sleeve, and hence the volume of air admitted to the cooler.

At the forward or inlet end of the cooling drum a return-bend conduit 27 opening through the stationary cover plate 8 extends in a horizontal plane and communicates with the lower end of a vertical riser pipe 28. The riser pipe at its upper end exhausts to atmosphere, and this riser pipe is intermediately provided with a butterfly valve 29 to control the escape of air from the system. A conduit 30 extends from the riser pipe at a point below the valve 29 to one end of a manifold 31 forming part of the burner 5. The air is thus delivered through the manifold into the kiln as the primary and secondary air of combustion. The primary air passes through the inner burner pipe 5b carrying with it in suspension the pulverized coal fed thereinto by the downspout 20, while the secondary air passes through the space intermediate the outer and inner burner pipes 5a and 5b to supplement the primary air in supporting combustion of the burner flame.

It will be apparent from the foregoing description that fresh air introduced into the outlet end of the cooling drum (which may if desired be of the multi-tube type) by the blower 22 will flow upwardly through the cooling drum countercurrent to the travel of the hot clinker which moves downwardly toward the outlet end of the drum. This air serves to cool the hot clinker and will itself become highly heated by the abstraction of heat from the clinker. In order that substantially constant heating conditions may be maintained within the kiln, it is necessary that the air delivered to the kiln be of substantially uniform pressure (or volume) and temperature. For insuring such conditions without varying the speed of the blower 22, which is designed to be operated at constant speed, a thermostat 32 and a pressure gage 33, represented diagrammatically in Fig. 1, are interposed in the conduit 30 for controlling the valves 26 and 29, respectively.

As represented in Fig. 2, the thermostat 32 is of the sylphon type including a cylinder 34 adapted to expand and contract under the influence of changes in temperature so as to rock an arm 35 movable over a series of contacts 36 connected by resistance 37. The arm is connected to one end of a conductor 38 forming a circuit including a source of electrical energy 39 and a solenoid 40, and the other end of the conductor is connected to the resistance 37. The solenoid 40 is connected to the valve 26 so as to open and close the valve varying extents according to the throw of the solenoid.

The pressure gage 33 is of the diaphragm type and comprises a housing 41 divided into two compartments by a movable metal diaphragm 42, the lower compartment being in communication with the conduit 30 and the upper compartment being open to atmosphere. Changes in pressure against the diaphragm causes movement of an arm 43. The latter arm, like the arm 35 of the thermostat, is adapted to sweep a series of contacts 44 connected by a resistance 45. The arm 43 and the resistance 45 form parts of a circuit 46 including a source of electrical energy 47 and a solenoid 48. The solenoid 48 is connected to the valve 29 so as to open and close the same according to the extent to which the solenoid 48 is energized. Any other suitable temperature and pressure controls may be employed for actuating the valves.

From the preceding description it will be apparent that when the temperature of the clinker passing through the cooling drum 9 increases for any reason—due, for example, to the breaking up of "rings" upon the interior of the kiln which interfere with the passage of the material—the temperature of the air passing through the cooling drum rises. This in turn tends to increase the temperature of the burner flame and to throw the heating conditions within the kiln further out of balance. To offset such a condition by reducing the volume of fresh air admitted to the cooling drum would interfere with the cooling efficiency of the cooler which requires an increase in the supply of air to compensate for the increase in temperature of the clinker.

In accordance with the present invention when, with the valve 26 in sleeve 23 and the valve 29 in riser pipe 28 in normal partially opened position, the air passing through the cooling drum increases in temperature above a predetermined limit thermostat 32 will operate through its mechanism which has already been described to open still further the butterfly valve 26, thereby increasing the quantity of air admitted to the cooler. This larger volume of air will accelerate the cooling of the clinker and its temperature will be reduced. This increased quantity of air, however, cannot be introduced into the kiln without seriously affecting heating conditions therein. Therefore, as the pressure of the air in the conduit 30 increases above a predetermined value, the pressure gage 33 will operate through its associated mechanism, previously described, to open the butterfly valve 29 and allow the excess volume of air to escape to atmosphere.

The thermostat and pressure gage thus together serve to maintain uniform heating conditions within the kiln regardless of changes in the temperature of the clinker in the cooler such as might be caused by factors not connected with the burner operation.

In Figs. 3 and 4 another form that the apparatus may take is illustrated diagrammatically. In Fig. 3 a rotary kiln 100 is shown as arranged above an inclined rotary cooling drum 101, the kiln and cooler corresponding in all substantial respects to the kiln 1 and cooler 9 of Fig. 1. A burner pipe 102 projects through a hood 103 into the lower discharge end of the kiln and fuel, such for example as pulverized coal, may be supplied to the burner from a hopper 104 by means of a screw conveyor 105. The hot clinker passing from the kiln discharges through a downspout 106 into a stationary housing 107 closing the elevated inlet end of the cooling drum. The lower outlet end of the cooling drum is closed by a hood 108 through which the clinker discharges onto a conveyor 109, located in a pit 110, for removing the clinker to a place of storage.

In this modification of the invention, instead of the blower or fan being located at the outlet end of the cooler, it is arranged intermediate the kiln and cooler. As shown in Fig. 3, a conduit 111 extends from the upper end of housing 107 to an air separator 112 of the cyclone type and from the separator another conduit 113 connects with the suction side of a blower 114. The outlet side of the blower discharges into a vertical riser pipe 115 which opens at its top to atmosphere. Branching off from the riser pipe intermediate its height is a conduit 116 leading to the burner pipe 102.

The construction of the various parts of this modification is the same as that described in connection with the embodiment in Fig. 1. It will be apparent that when the blower is operated at constant speed air will be drawn into the cooling drum 101 through the space provided in hood 108 for the discharge of the clinker, and this air in its travel through the cooling drum in contact with the hot clinker will become heated, leaving the cooler through housing 107. From the housing the air will pass into the separator 112 where a large portion of the dust carried in suspension by the air will be removed. The cleansed air from the separator will be drawn into one side of the blower 114 and discharged from its other side into the riser pipe 115 and through conduit 116 into the burner pipe 102 for providing the primary and secondary air of combustion for the fuel introduced into the burner pipe by the conveyor 105.

In order to insure uniform burner operation, there is provided a butterfly valve 117 in the conduit 111 connecting the housing 107 with air separator 112, this valve controlling the amount of air passing through the cooler in substantially the same manner as the valve 26 of the modification of Fig. 1. A second butterfly valve 118 is interposed in the vertical riser pipe 115 above the connection of conduit 116 with the riser pipe, and the function of this valve is to regulate the amount of air expelled to the atmosphere and the amount of air entering the burner pipe. This valve 118 corresponds to the valve 29 of the embodiment of the invention previously described.

The valves 117 and 118 are controlled respectively through heat and pressure responsive means located at any suitable points in the system, as for example in the conduit 116, and indicated generally by the reference numerals 119 and 120. These temperature and pressure responsive means may correspond to the thermostat 32 and pressure gage 33 described in connection with the form of the invention shown in Fig. 1 and including mechanism similar to that schematically shown in Fig. 2 for operating the valves.

When the temperature of the air passing through the cooling drum increases, thermostat 119 will function to further open the valve 117 to increase the amount of fresh air passing through the cooler; whereas if the temperature decreases, the thermostat will operate to cut down the quantity of air moving through the cooler. In order to maintain a fairly constant supply of air to the burner, the pressure gage 120 opens and closes the valve 118 in the riser to exhaust more or less air to the atmosphere in accordance with pressure conditions within the conduit 116. The operation of the two embodiments of Fig. 1 and 3 to insure optimum performance of the burner is substantially the same, notwithstanding the transposition of the blowers. However, the form of the invention illustrated in Fig. 3 has the additional advantage that the air, by reason of its passage through the separator 112, enters the burner free from any excessive amount of dust, which dust is usually undesirable. The dust removed by the separator 112 as well as the small particles of clinker which sift through the grate (not shown) in the bottom of housing 107 may be carried away by spiral conveyors, one of which is indicated at 121.

The method and apparatus of the invention may be practiced or embodied in other specific ways or forms without departing from the spirit or essential characteristics of the invention, and the present description is therefore to be considered illustrative and not restrictive, and all variations which come within the meaning and range of equivalency of the claims are intended to be embraced therein.

I claim:

1. A method for insuring uniform heating conditions within a kiln of the rotary type having a cooler connected in circuit therewith for cooling the material discharged from the kiln, said method comprising introducing fresh air into the cooler in heat transfer relation with the material contained therein and thence delivering said air into the kiln to support combustion of the burner flame therein and controlling the temperature of the heated air entering the kiln in accordance with the temperature of the material in the cooler.

2. A method for insuring uniform heating conditions within a kiln of the rotary type having a cooler connected in circuit therewith for cooling the material discharged from the kiln, said method comprising introducing fresh air into the cooler in heat transfer relation with the material contained therein and thence delivering said air into the kiln to support combustion of the burner flame therein and controlling the volume of the air entering the cooler in accordance with the temperature of the material in the cooler.

3. A method for insuring uniform heating conditions within a kiln of the rotary type having a cooler connected in circuit therewith for cooling the material discharged from the kiln, said method comprising introducing fresh air into the cooler in heat transfer relation with the material contained therein and thence delivering said air into the kiln to support combustion of the burner flame therein and controlling the temperature of the heated air entering the kiln and the volume of air entering the cooler by the temperature of the material in the cooler.

4. A method for insuring uniform heating conditions within a kiln of the rotary type having a cooler connected in circuit therewith for cooling the material discharged from the kiln, said method comprising introducing fresh air into the cooler in heat transfer relation with the material contained therein and thence delivering said air into the kiln to support combustion of the burner flame therein and controlling the temperature of the heated air entering the kiln while maintaining its volume constant by varying the quantity of fresh air admitted to the cooler and the quantity of heated air vented to the atmosphere after passage through the cooler.

5. In combination with a rotary kiln having a burner for directing a flame within one of its ends and a cooler in circuit with the kiln for receiving material discharged from the kiln, means for admitting outside air into the cooler in heat-transfer relation to the material contained therein, means for conducting air from the cooler into the kiln and means for controlling the admission of air into the cooler in response to the temperature of the air delivered from the cooler.

6. In combination with a rotary kiln having a burner for directing a flame within one of its ends and a cooler in circuit with the kiln for receiving material discharged from the kiln, means for admitting outside air into the cooler in heat-transfer relation to the material contained therein, means for conducting air from the cooler into the kiln and means for controlling the volume of air admitted to the kiln in response to the pressure of the air delivered from the cooler.

7. In combination with a rotary kiln having a burner for directing a flame within one of its ends and a cooler in circuit with the kiln for receiving material discharged from the kiln, means for admitting outside air into the cooler in heat-transfer relation to the material contained therein, means for conducting air from the cooler into the kiln, means for controlling the admission of air into the cooler and into the kiln in response to the temperature and pressure of the air delivered from the cooler.

8. In combination with a rotary kiln having a burner for directing a flame within one of its ends and a cooler in circuit with the kiln for receiving material discharged from the kiln, a blower adapted to operate at constant speed for causing a flow of air through the cooler in heat-transfer relation to the material contained therein, a valve for admitting outside air into the cooler, a conduit for conducting air from the cooler into the kiln, a valve interposed in said conduit for the expulsion of air therefrom and means for independently controlling said valves in response to temperature and pressure conditions within the conduit.

9. In combination with a rotary kiln having a burner for directing a flame within one of its ends and a cooler in circuit with the kiln for receiving material discharged from the kiln, a blower adapted to operate at constant speed for causing a flow of air through the cooler in heat-transfer relation to the material contained therein, a valve for admitting outside air into the cooler, a conduit for conducting air from the cooler into the kiln, a valve interposed in said conduit for the expulsion of air therefrom, means responsive to the temperature of the air in said conduit for controlling the valve admitting air into the cooler and means responsive to the pressure of the air in the conduit for controlling the valve in the conduit.

10. In combination with a rotary kiln having a burner for directing a flame within one of its ends and a rotary cooling drum in circuit with the kiln for receiving material discharged from the kiln, a blower adapted to operate at a constant speed for causing a flow of air through the cooling drum in heat-transfer relation to the material contained therein, a valve for admitting outside air into the cooler, a conduit system for conducting air from the cooler into the burner pipe, said conduit system including a riser pipe exhausting to atmosphere, a valve interposed in said riser pipe for the expulsion of air therefrom, a thermostat located in the conduit system for controlling the valve admitting air into the cooler and a pressure gage located in the conduit system for controlling the valve in the riser pipe, said thermostat and pressure gage being so constructed and arranged to insure uniformity of the temperature and volume of the air delivered to said burner.

11. In combination with a rotary kiln having a burner for directing a flame within one of its ends, a rotary cooling drum located adjacent the kiln, a feed spout for receiving hot material from the kiln and introducing it into the inlet end of the cooling drum, a blower adapted to operate at constant speed for moving outside air into and through the cooling drum in heat-transfer counter-current relation to the material traveling through the cooling drum, a valve controlling the amount of air passing through the cooling drum, a conduit system for conducting air from the cooling drum into the burner for supplying both its primary and secondary air of combustion and means for actuating said valves in predetermined relation so as to maintain a substantially uniform flow of air to the burner, said blower being located at the discharge end of the cooling drum.

12. In combination with a rotary kiln having a burner for directing a flame within one of its ends, a rotary cooling drum located adjacent the kiln, a feed spout for receiving hot material from the kiln and introducing it into the inlet end of the cooling drum, a blower adapted to operate at constant speed for moving outside air into and through the cooling drum in heat-transfer counter-current relation to the material traveling through the cooling drum, a valve for controlling the amount of air traveling through the cooling drum, a conduit system including an air separator for conducting air from the cooling drum into the burner for supplying both its primary and secondary air of combustion and means for actuating said valves in predetermined relation so as to maintain a substantially uniform flow of clean air to the burner.

13. In combinattion with a rotary kiln having a burner for directing a flame within one of its ends, a rotary cooling drum located adjacent the kiln, a feed spout for receiving hot material from the kiln and introducing it into the inlet end of the cooling drum, a blower adapted to operate at constant speed for moving outside air into and through the cooling drum in heat-transfer counter-current relation to the material traveling through the cooling drum, a valve controlling the amount of air passing through the cooling drum, a conduit system for conducting air from the cooling drum into the burner for supplying both its primary and secondary air of combustion and temperature and pressure responsive means for concurrently actuating said valves so as to maintain a substantially uniform flow of air to the burner at substantially constant temperature, said blower being located intermediate the kiln and cooling drum.

14. In combination with a rotary kiln having a burner for directing a flame within one of its ends, a rotary cooling drum located adjacent the kiln, a feed spout for receiving hot material from the kiln and introducing it into the inlet end of the cooling drum, a blower adapted to operate at constant speed for moving outside air into and through the cooling drum in heat-transfer counter-current relation to the material traveling through the cooling drum, a valve controlling the amount of air passing through the cooling drum, a conduit system for conducting air from the cooling drum into the burner for supplying both its primary and secondary air of combustion and temperature and pressure responsive means for concurrently actuating said valves so as to maintain a substantially uniform flow of air to the burner at substantially constant temperature and pressure, said blower being located intermediate the kiln and cooling drum.

RICHARD D. CHEESMAN.